United States Patent
Kim et al.

(10) Patent No.: US 11,403,235 B2
(45) Date of Patent: Aug. 2, 2022

(54) MEMORY AND MEMORY SYSTEM

(71) Applicant: SK hynix Inc., Gyeonggi-do (KR)

(72) Inventors: Da Hoo Kim, Gyeonggi-do (KR); Il Park, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 25 days.

(21) Appl. No.: 17/028,513

(22) Filed: Sep. 22, 2020

(65) Prior Publication Data
US 2021/0191881 A1    Jun. 24, 2021

(30) Foreign Application Priority Data
Dec. 23, 2019   (KR) .......................... 10-2019-0173147

(51) Int. Cl.
| | | |
|---|---|---|
| H04L 29/06 | (2006.01) | |
| G06F 12/14 | (2006.01) | |
| H04L 9/06 | (2006.01) | |
| G11C 29/44 | (2006.01) | |
| H04L 9/14 | (2006.01) | |
| G11C 29/42 | (2006.01) | |
| H04L 9/08 | (2006.01) | |

(52) U.S. Cl.
CPC ...... *G06F 12/1408* (2013.01); *G06F 12/1466* (2013.01); *G11C 29/42* (2013.01); *G11C 29/44* (2013.01); *H04L 9/0656* (2013.01); *H04L 9/0819* (2013.01); *H04L 9/14* (2013.01)

(58) Field of Classification Search
CPC . G06F 12/1408; G06F 12/1466; G11C 29/42; G11C 29/44; H04L 9/0656; H04L 9/0819; H04L 9/14

USPC ........................................................ 713/193
See application file for complete search history.

(56) References Cited

U.S. PATENT DOCUMENTS

2009/0217058 A1 *   8/2009   Obereiner ............... G06F 21/79
                                                        713/193
2009/0323942 A1 * 12/2009   Sharon ................ G11C 16/3427
                                                         380/28

FOREIGN PATENT DOCUMENTS

KR    10-2018-0081901        7/2018

OTHER PUBLICATIONS

US 10,331,577 B2, 06/2019, Xu et al. (withdrawn)

* cited by examiner

*Primary Examiner* — Evans Desrosiers
(74) *Attorney, Agent, or Firm* — IP & T Group LLP

(57) ABSTRACT

A memory may include: a pseudorandom number generator suitable for generating a pseudorandom number using an initial value transferred from a memory controller; an access key register suitable for storing an access key transferred from the memory controller; a counter suitable for counting the number of times that the access key register is updated to generate an update number; a logic operation circuit suitable for generating an authentication key by performing a logic operation on the pseudorandom number and the update number; a comparison circuit suitable for comparing the access key and the authentication key; and a security area to which access is allowed when the comparison result of the comparison circuit indicates that the access key and the authentication key are the same.

19 Claims, 4 Drawing Sheets

MEMORY AND MEMORY SYSTEM

CROSS-REFERENCE TO RELATED APPLICATION

This application claims priority under 35 U.S.C. § 119 to Korean Patent Application No. 10-2019-0173147 filed on Dec. 23, 2019, which is incorporated herein by reference in its entirety.

BACKGROUND

1. Field

Various embodiments relate to a memory and a memory system, and more particularly, to the security of a memory.

2. Discussion of the Related Art

Recently, much attention has been paid to the security issue in which an unauthorized user extorts important data, such as a user password and security key stored in a memory, from the memory through various hacking methods such as row hammer, RAMBleed, cold boot attack and cross-CPU attack.

In order to solve such a security issue, various methods are used. For example, data stored in the memory are encrypted or scrambled. However, an authentication key may be leaked or system performance overhead may be increased as a result of performing operations to address the security issue.

SUMMARY

Various embodiments are directed to a technology capable of strengthening the security of a memory.

In an embodiment, a memory may include: a pseudorandom number generator suitable for generating a pseudorandom number using an initial value transferred from a memory controller; an access key register suitable for storing an access key transferred from the memory controller; a counter suitable for counting the number of times that the access key register is updated to generate an update number; a logic operation circuit suitable for generating an authentication key by performing a logic operation on the pseudorandom number and the update number; a comparison circuit suitable for comparing the access key and the authentication key; and a security area to which access is allowed when the comparison result of the comparison circuit indicates that the access key and the authentication key are the same.

In an embodiment, a memory system may include: a memory; and a memory controller suitable for controlling the memory, wherein the memory comprises: a pseudorandom number generator suitable for generating a pseudorandom number using an initial value transferred from the memory controller; an access key register suitable for storing an access key transferred from the memory controller; a counter suitable for counting the number of times that the access key register is updated to generate an update number; a logic operation circuit suitable for generating an authentication key by performing a logic operation on the pseudorandom number and the update number; a comparison circuit suitable for comparing the access key and the authentication key; and a security area to which access is allowed when the comparison result of the comparison circuit indicates that the access key and the authentication key are the same.

In an embodiment, a security system comprising client and server devices may include: wherein each of the client and server devices includes: a first circuit suitable for generating a pseudorandom number based on a seed value and a coefficient; and a second circuit suitable for counting a number of updates of a first key to generate an update number, wherein the client device further includes a third circuit suitable for generating the first key based on the pseudorandom number and the update number generated thereby, and wherein the server device further includes: a fourth circuit suitable for generating a second key based on the pseudorandom number and the update number generated thereby; and a fifth circuit suitable for allowing access to a secured area depending on the first and second keys.

In accordance with embodiments, it is possible to strengthen the security of the memory.

DETAILED DESCRIPTION

Figure 1:
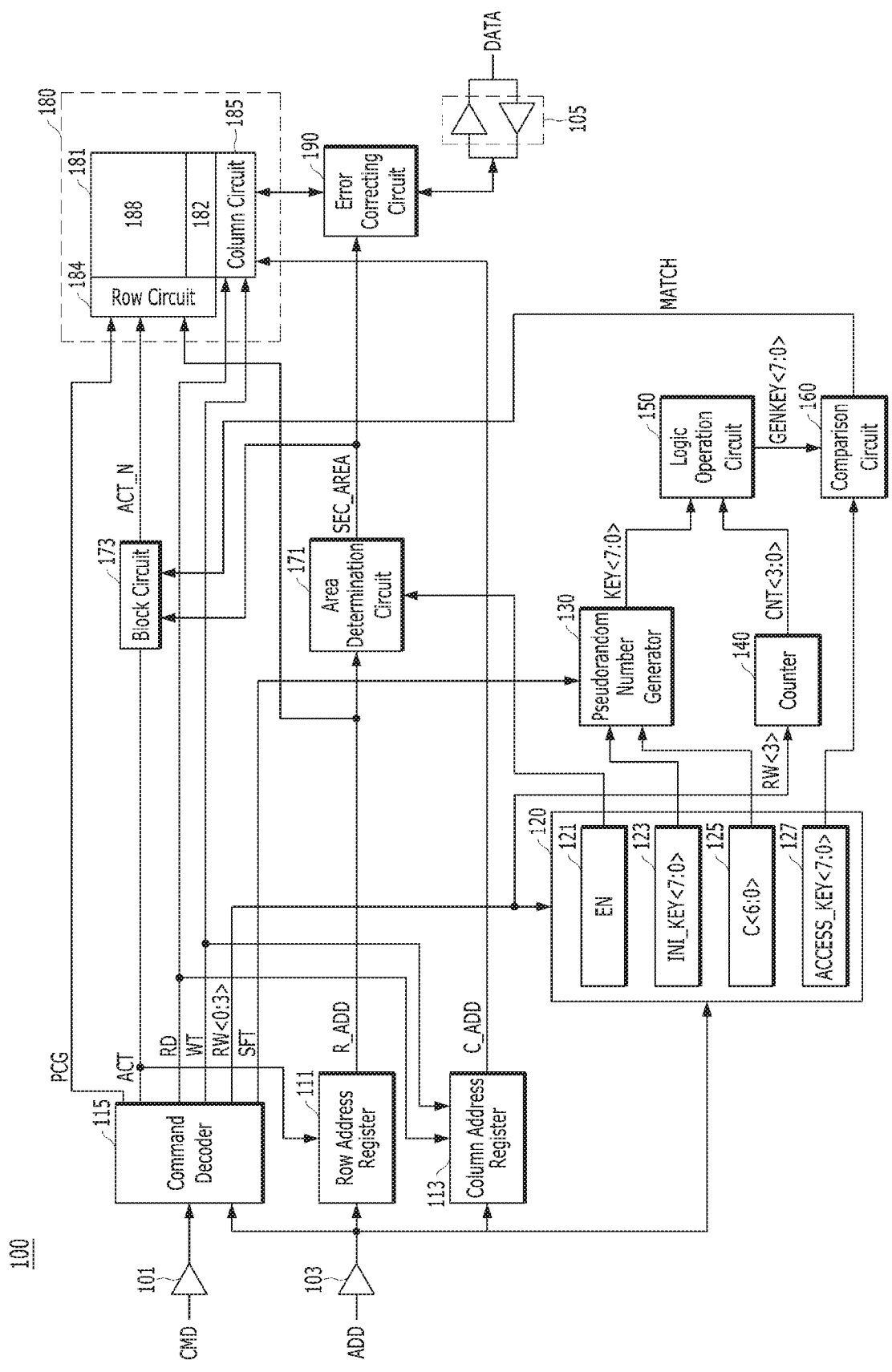
FIG. 1 is a diagram illustrating a configuration of a memory in accordance with an embodiment.

Hereafter, embodiments are described with reference to the accompanying drawings, in order to describe the present invention in detail to enable a person skilled in the art to which the present disclosure to practice the present invention. In the following description, well-known material may be omitted. Like components are identified by like reference numerals throughout the different drawings. Also, throughout the specification, reference to "an embodiment" or the like is not necessarily to only one embodiment, and different references to any such phrase are not necessarily to the same embodiment(s).

FIG. 1 is a diagram illustrating a memory 100 in accordance with an embodiment.

Referring to FIG. 1, the memory 100 may include a command receiving circuit 101, an address receiving circuit 103, a data transmitting/receiving circuit 105, a row address register 111, a column address register 113, a command decoder 115, a register circuit 120, a pseudorandom number generator 130, a counter 140, a logic operation circuit 150, a comparison circuit 160, an area determination circuit 171, a block circuit 173, a memory core 180 and an error correcting circuit 190.

Figure 2:
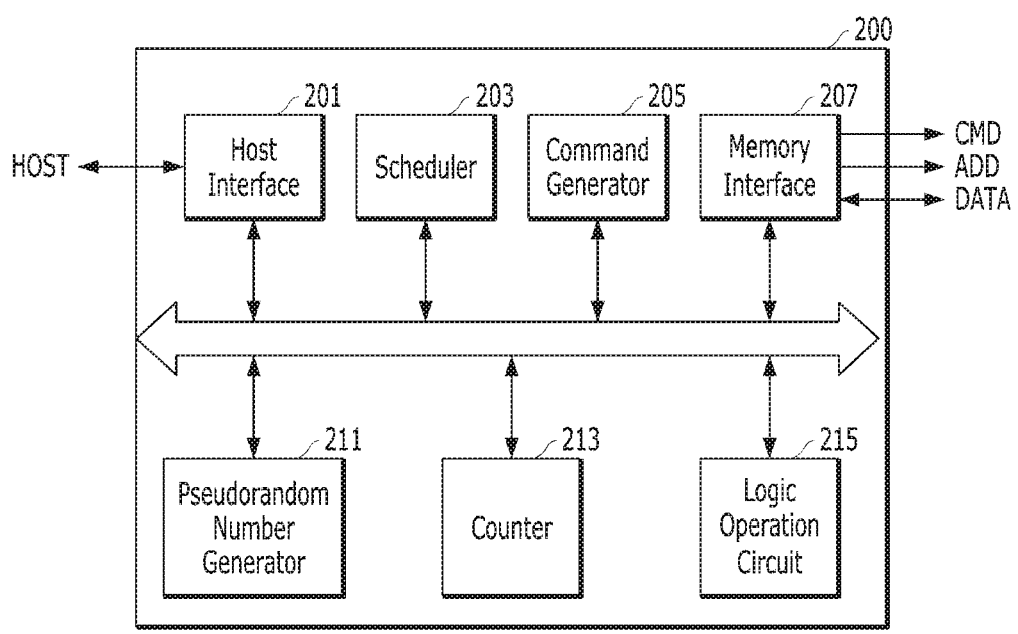
FIG. 2 is a diagram illustrating a configuration of a memory controller in accordance with an embodiment.

The command receiving circuit 101 may receive a command CMD transferred from a memory controller 200 (shown in FIG. 2). The command CMD may have multiple bits. The address receiving circuit 103 may receive an address ADD transferred from the memory controller 200. The address ADD may have multiple bits. The data transmitting/receiving circuit 105 may transmit/receive data DATA to/from the memory controller 200. During a write operation, data DATA may be transmitted from the memory controller 200 to the memory 100. During a read operation, data DATA may be transmitted from the memory 100 to the memory controller 200. The data DATA may have multiple bits.

The command decoder 115 may generate internal command signals by decoding the command CMD received through the command receiving circuit 101. The command decoder 115 may decode not only the command CMD received through the command receiving circuit 101 but also some bits of the address ADD received through the address receiving circuit 103, in order to generate the internal command signals. The internal command signals may include an active signal ACT, a precharge signal PCG, a read signal RD, a write signal WT, a plurality of register write signals RW<0:3> and a shift signal SFT.

The row address register 111 and the column address register 113 may sort the address ADD received through the address receiving circuit 103 into a row address R_ADD or a column address C_ADD, and store the row address R_ADD or the column address C_ADD. When a command requiring a row address is applied, that is, when the active signal ACT is enabled, the row address register 111 may sort the address ADD into the row address R_ADD and store the row address R_ADD. When a command requiring the column address C_ADD is applied, that is, when the read signal RD or the write signal WT is enabled, the column address register 113 may sort the address ADD into the column address C_ADD, and store the column address C_ADD.

The register circuit 120 may include an enable register 121, an initial value register 123, a coefficient register 125 and an access key register 127. Each of the registers 121, 123, 125 and 127 may be updated using information transferred through the address ADD received by the address receiving circuit 103, when the corresponding register write signal among the register write signals RW<3:0> is enabled. That is, the information transferred from the memory controller 200 may be stored in the registers 121, 123, 125 and 127 of the register circuit 120.

The enable register 121 may store an enable bit EN for indicating whether a security area 182 is used. When the enable bit EN is '1', it may indicate that the security area 182 is used as a secure area for storing security data. When the enable bit EN is '0', it may indicate that the security area 182 is used as a normal (non-secure) area 188 for storing normal data, that is data that does not need to be securely maintained. The enable bit EN may be written to the enable register 121 when the register write signal RW<0> is enabled.

The initial value register 123 may store an initial value INI_KEY<7:0> which is to be used by the pseudorandom number generator 130. The initial value INI_KEY<7:0> may be written to the initial value register 123 when the register write signal RW<1> is enabled.

The coefficient register 125 may store a coefficient C<6:0> which is to be used by the pseudorandom number generator 130. The coefficient C<6:0> may be written to the coefficient register 125 when the register write signal RW<2> is enabled.

The access key register 127 may store an access key ACCESS_KEY<7:0> transferred from the memory controller 200. The access key ACCESS_KEY<7:0> may be written to the access key register 127 when the register write signal RW<3> is enabled.

The pseudorandom number generator 130 may generate a pseudorandom number KEY<7:0>. The pseudorandom number generator 130 may use the initial value INI_KEY<7:0> and the coefficient C<6:0>. Furthermore, the pseudorandom number generator 130 may generate a new pseudorandom number KEY<7:0> by performing a shift operation whenever the shift signal SFT is enabled.

The counter 140 may count the number of times that the access key ACCESS_KEY<7:0> is updated in the access key register 127. That is, the counter 140 may count the number of times that the register write signal RW<3> is enabled, and output a counting code CNT<3:0>.

The logic operation circuit 150 may generate an authentication key GENKEY<7:0> by performing a logic operation on the pseudorandom number KEY<7:0> and the counting code CNT<3:0>. The logic operation circuit 150 may include a plurality of XOR gates for performing an XOR operation on the pseudorandom number KEY<7:0> and the counting code CNT<3:0>.

The comparison circuit 160 may compare the authentication key GENKEY<7:0> generated by the logic operation circuit 150 to the access key ACCESS_KEY<7:0> stored in the access key register 127. The comparison circuit 160 may enable a match signal MATCH to '1' when the authentication key GENKEY<7:0> coincides with, i.e., is the same as, the access key ACCESS_KEY<7:0>.

The area determination circuit 171 may be enabled when the enable bit EN is '1'. When the area determination circuit 171 is enabled, the area determination circuit 171 may generate a security area signal SEC_AREA by determining whether the security area 182 or the normal area 183 is to be accessed, using some bits of the row address R_ADD (for example, the top three bits of the row address). The area determination circuit 171 may enable the security area signal SEC_AREA to '1', when determining that the security area 182 is to be accessed, and disable the security area signal SEC_AREA to '0', when determining that the normal area 183 is to be accessed. When the enable bit EN is '0', the area determination circuit 171 may be disabled. In this case, the security area signal SEC_AREA may be fixed to '0'.

When the security area signal SEC_AREA is the block circuit 173 may transfer the active signal ACT to the memory core 180 in the case that the match signal MATCH is '1', and block the active signal ACT without transferring the active signal ACT to the memory core 180, in the case that the match signal MATCH is '0'. That is, when the security area 182 is enabled and the security area 182 is to be accessed, the block circuit 173 may transfer the active signal ACT to the memory core 180 in the case that the authentication key GENKEY<7:0> and the access key ACCESS_KEY<7:0> coincide with each other, and block the transfer of the active signal AC to the memory core 180 in the case that the authentication key GENKEY<7:0> and the access key ACCESS_KEY<7:0> are not the same, i.e., do not coincide with each other. Table 1 shows the operation of the block circuit 173.

TABLE 1

| SEC_AREA | MATCH | Block Circuit Operation |
| --- | --- | --- |
| 1 | 1 | ACT_N = ACT |
| 1 | 0 | ACT_N = '0' |
| 0 | don't care | ACT_N = ACT |

When the block circuit 173 blocks the transfer of the active signal ACT, access to the memory core 180 may be prevented.

The memory core 180 may include a cell array 181, a row circuit 184 and a column circuit 185. The cell array 181 may include a plurality of memory cells for storing data. The cell array 181 may include the security area 182 for storing security data and the normal area 183 for storing general data. The row circuit 184 may control a row operation of the cell array 181. The row circuit 184 may activate a row selected in the cell array 181 by the row address R_ADD, i.e., a word line, when an active signal ACT_N transferred from the block circuit 173 is enabled. When a precharge signal PCG is enabled, the row circuit 184 may precharge the activated row. The column circuit 185 may read data from a column selected in the cell array 181 by the column address C_ADD when the read signal RD is enabled, and write data to a column selected in the cell array 181 by the column address C_ADD when the write signal WT is enabled.

The error correcting circuit 190 may generate an error correction code using data DATA received through the data transmitting/receiving circuit 105 during a write operation. The error correction code may be stored in the cell array 181 through the column circuit 185 with the data DATA. Furthermore, the error correcting circuit 190 may correct an error of the data DATA using the error correction code outputted from the cell array 181 through the column circuit 185, during a read operation. The error correcting circuit 190 may be enabled when the security area signal SEC_AREA is '0', and disabled when the security area signal SEC_AERA is '1'. This is because, since the memory controller 200 often uses a stronger error correction algorithm when data are written to/read from the security area 182, the error correcting circuit 190 within the memory 100 does not need to be used. The error correcting circuit 190 may be designed to be enabled at all times regardless of the logical level of the security area signal SEC_AREA.

The security area 182 can be accessed only when the access key ACCESS_KEY<7:0> coincides with, i.e., is the same as, the authentication key GENKEY<7:0>. The authentication key GENKEY<7:0> is generated by reflecting the initial value INI_KEY<7:0> and the coefficient C<6:0>, which are transferred from the memory controller 200, the number of times that the memory controller 200 applies a shift command (the number of times that the shift signal SFT is enabled), and the number of times that the memory controller 200 updates the access key ACCESS_KEY<7:0>. Therefore, access to the security area 182 by another memory controller, which is not the designated memory controller, may be completely blocked.

FIG. 2 is a diagram illustrating the memory controller 200 in accordance with an embodiment.

The memory controller 200 may control the operation of the memory 100 according to a request of the host (HOST). Examples of the host include a CPU (Central Processing Unit), GPU (Graphics Processing Unit), AP (Application Processor) and the like. As illustrated in FIG. 2, the memory controller 200 may include a host interface 201, a scheduler 203, a command generator 205, a memory interface 207, a pseudorandom number generator 211, a counter 213 and a logic operation circuit 215. The memory controller 200 may be included in the CPU, GPU, AP or the like. In this case, the host may indicate components other than the memory controller 200 in the CPU, GPU, AP or the like. For example, when the memory controller 200 is included in the CPU, the host of FIG. 2 may indicate the other components excluding the memory controller 200 from the CPU.

The host interface 201 may be an interface for communication between the host and the memory controller 200.

The scheduler 203 may decide the order in which requests from the host are to be transferred to the memory 100. The scheduler 203 may set the transfer order to be different than the order in which requests are received from the host and thus change the order of operations which the memory 100 is instructed to perform, in order to improve the performance of the memory 100. For example, although the host first requested a read operation of the memory 100 and then requested a write operation, the scheduler 203 may adjust the order such that the write operation is performed before the read operation.

The command generator 205 may generate a command to be applied to the memory 100 according to the operation order decided by the scheduler 203.

The memory interface 207 may serve as an interface between the memory controller 200 and the memory 100. Through the memory interface 207, the command CMD and the address ADD may be transferred from the memory controller 200 to the memory 100, and the data DATA may be transmitted therebetween. The memory interface 207 may also be referred to as a PHY interface.

The pseudorandom number generator 211 may be designed in the same manner as the pseudorandom number generator 130 of the memory 100. The initial value INI_KEY<7:0> and the coefficient C<6:0> of the pseudorandom number generator 211 may be set to the same values. Furthermore, the number of times that the pseudorandom number generator 130 performs the shift operation may be equal to the number of times that the pseudorandom number generator 211 performs the shift operation. Since the initial value INI_KEY<7:0>, the coefficient C<0:6> and the shift signal SHIFT, which are used in the pseudorandom number generator 130 of the memory 100, are transferred from the memory controller 200, the pseudorandom number generators 211 and 130 may use the same initial value INI_KEY<7:0>, the same coefficient C<0:6> and the same shift signal SHIFT. That is, the pseudorandom number generators 211 and 130 may generate the same pseudorandom number KEY<7:0>.

The counter 213 may be designed in the same manner as the counter 140 of the memory 100. The counting code CNT<3:0> of the counter 140 of the memory 100 and the counting code CNT<3:0> of the counter 213 of the memory controller 200 may retain the same value. The counter 140 of the memory 100 may count the number of times that the register write signal RW<3> is enabled. Since the register write signal RW<3> is generated by the command CMD transferred from the memory controller 200, the counting codes CNT<3:0> of the counters 213 and 140 may retain the same value.

The logic operation circuit 215 may be designed in the same manner as the logic operation circuit 150 of the memory 100. The logic operation circuit 215 may generate the access key ACCESS_KEY<7:0> by performing an XOR operation on the pseudorandom number KEY<7:0> generated by the pseudorandom number generator 211 and the counting code CNT<3:0> generated by the counter 140. The access key ACCESS_KEY<7:0> generated by the logic operation circuit 215 may be equal to the authentication key GENKEY<7:0> generated by the logic operation circuit 150.

The components 211, 213 and 215 for generating the access key ACCESS_KEY<7:0> in the memory controller 200 may be designed in the same manner as their respective counterpart components 130, 140 and 150 for generating the authentication key GENKEY<7:0> in the memory 100. The components 211, 213 and 215 of the memory controller 200 use the same variables as the components 130, 140 and 150 of the memory 100. Thus, the access key ACCESS_KEY<7:0> generated by the components 211, 213 and 215 may be equal to, i.e., the same as, the authentication key GENKEY<7:0> generated by the components 130, 140 and 150.

When intending to access the security area 182 of the memory 100, the memory controller 200 may update the access key ACCESS_KEY<7:0>, generated by the components 211, 213 and 215, into the access key register 127 of the memory 100 through the memory interface 207, and then access the security area. When the access to the security area 182 is finished, the memory controller 200 may update a fake access key into the access key register 127 instead of the real access key ACCESS_KEY<7:0> generated by the components 211, 213 and 215, such that access to the security area 182 becomes impossible. Since only the memory controller 200 knows the correct access key ACCESS_KEY<7:0>, access to the security area 182 of the memory 100 by another memory controller, not the memory controller 200, may be blocked. That is, the security of the data stored in the security area 182 may be maintained.

Figure 3:
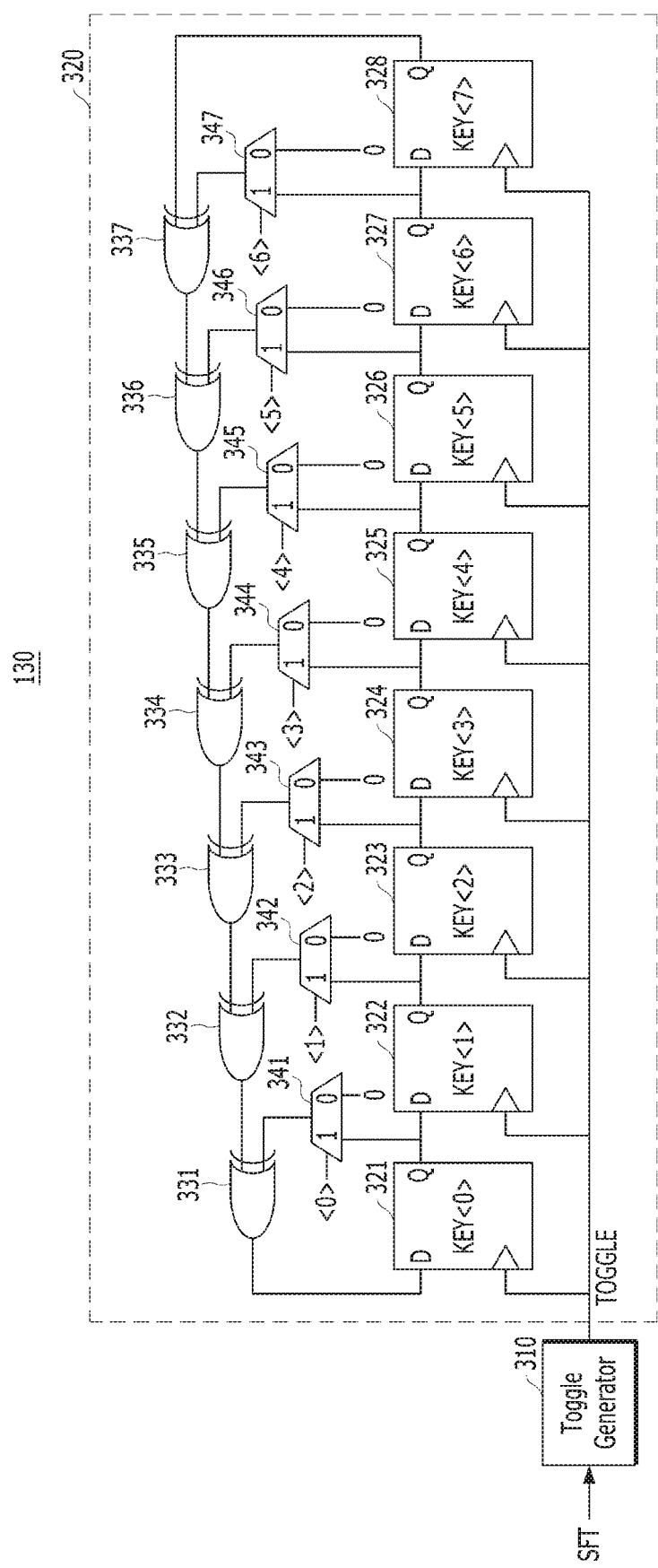
FIG. 3 is a diagram illustrating an embodiment of a pseudorandom number generator, such as that of FIG. 1.

FIG. 3 is a diagram illustrating an embodiment of the pseudorandom number generator 130 of FIG. 1.

Referring to FIG. 3, the pseudorandom number generator 130 may include a toggle generator 310 and an LFSR (Linear Feedback Shift Register) 320.

The toggle generator 310 may enable a toggle signal TOGGLE whenever the shift signal SHF is enabled.

The LFSR 320 may include D flip-flops 321 to 328 coupled in series, XOR gates 331 to 337 for feedback, and selectors 341 to 347 for deciding the feedback characteristics of the LFSR 320 in response to the coefficient C<6:0>.

Each of the D flip-flops 321 to 328 may have an initial value set to the corresponding initial value of INI_KEY<7:0>. For example, the initial value of the D flip-flop 321 may be INI_KEY<0>, and the initial value of the D flip-flop 324 may be INI_KEY<3>. The XOR gates 331 to 337 may be used for feedback of the D flip-flops 321 to 328, and the feedback characteristics may be decided according to selections of the selectors 341 to 347 according to the coefficient C<6:0>. For example, the selector 344 may select '0' and input '0' to the XOR gate 334, when C<3> is '0', and select an output of the D flip-flop 324 and input the selected output to the XOR gate 334 when C<3> is '1'. Furthermore, the selector 346 may select '0' and input '0' to the XOR gate 336, when C<5> is '0', and select an output of the D flip-flop 324 and input the selected output to the XOR gate 334 when C<3> is '1'. That is, depending on what the selectors 341 to 347 select according to the coefficient C<6:0>, the feedback characteristics of the LFSR 320 may be decided.

The D flip-flops 321 to 328 may perform the shift operation whenever the toggle signal TOGGLE is enabled.

The values stored in the D flip-flops 321 to 328 may become the pseudorandom number KEY<7:0>. The pseudorandom number KEY<7:0> may be decided according to the initial value INI_KEY<7:0>, the coefficient C<6:0> for deciding the feedback characteristics, and the number of times that the shift signal SFT is enabled.

Figure 4:
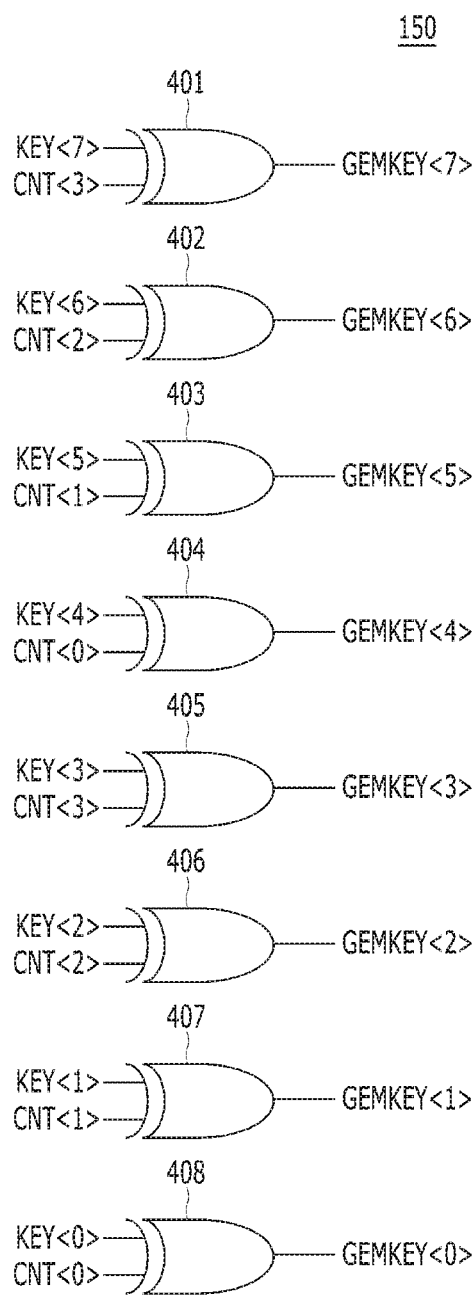
FIG. 4 is a diagram illustrating an embodiment of a logic operation circuit, such as that of FIG. 1.

FIG. 4 is a diagram illustrating an embodiment of the logic operation circuit 150 of FIG. 1.

Referring to FIG. 4, the logic operation circuit 150 may include XOR gates 401 to 408.

The XOR gates 401 to 408 may generate the authentication key GENKEY<7:0> by performing logic operations on the pseudorandom number KEY<7:0> and the counting code CNT<3:0>. Since the pseudorandom number KEY<7:0> has eight bits and the counting code CNT<3:0> has four bits, the authentication key GENKEY<7:0> may be generated through a method of performing XOR operations on the top four bits of the pseudorandom number KEY<7:0> and the counting code CNT<3:0> and performing XOR operations on the bottom four bits of the pseudorandom number KEY<7:0> and the counting code CNT<3:0>, as shown in FIG. 4.

The XOR gate 401 may receive KEY<7> and CNT<3> and output GENKEY<7>. The XOR gate 402 may receive KEY<6> and CNT<2> and output GENKEY<6>. The XOR gate 403 may receive KEY<5> and CNT<1> and output GENKEY<5>. The XOR gate 404 may receive KEY<4> and CNT<0> and output GENKEY<4>. The XOR gate 405 may receive KEY<3> and CNT<3> and output GENKEY<3>. The XOR gate 406 may receive KEY<2> and CNT<2> and output GENKEY<2>. The XOR gate 407 may receive KEY<1> and CNT<1> and output GENKEY<1>. The XOR gate 408 may receive KEY<0> and CNT<0> and output GENKEY<0>.

Although various embodiments have been illustrated and described, it will be apparent to those skilled in the art that various changes and modifications may be made without departing from the spirit and scope of the invention as defined in the following claims. The present invention encompasses all such changes and modifications that fall within the scope of the claims.

What is claimed is:

1. A memory comprising:
   a pseudorandom number generator configured to generate a pseudorandom number using an initial value transferred from a memory controller;
   an access key register configured to store an access key transferred from the memory controller;
   a counter configured to count the number of times that the access key register is updated to generate an update number;
   a logic operation circuit configured to generate an authentication key by performing a logic operation on the pseudorandom number and the update number;
   a comparison circuit configured to compare the access key and the authentication key; and
   a security area to which access is allowed when the comparison result of the comparison circuit indicates that the access key and the authentication key are the same,
   wherein the pseudorandom number generator comprises a Linear Feedback Shift Register (LFSR),
   wherein the initial value is used as a seed of the LFSR, and
   wherein the LFSR has a feedback characteristic which is decided by a coefficient transferred from the memory controller.

2. The memory of claim 1, wherein the LFSR performs a shift operation in response to a shift command transferred from the memory controller.

3. The memory of claim 2, further comprising:
   an enable register configured to store an enable bit for indicating whether the security area is used; and
   a coefficient register configured to store the coefficient.

4. The memory of claim 1, wherein the logic operation circuit comprises a plurality of XOR gates configured to perform a logic operation on the pseudorandom number and the update number.

5. The memory of claim 1,
   wherein the security area is included in a memory core, and
   wherein the memory core comprises a normal area to which access is allowed, regardless of the comparison result of the comparison circuit.

6. The memory of claim 5,
wherein the memory further comprises an error correcting circuit configured to correct an error of data outputted from the memory core, and
wherein the error correcting circuit is disabled when the security area is accessed.

7. The memory of claim 5, further comprising:
a command decoder configured to generate an active signal by decoding a command;
an area determination circuit configured to determine whether access to the security area is requested or access to the normal area is requested, using some bits of a row address; and
a block circuit configured to block transfer of the active signal to the memory core when the comparison result of the comparison circuit indicates that the access key and the authentication key are different, in the case that the area determination circuit determines that the access to the security area is requested.

8. A memory system comprising:
a memory; and
a memory controller configured to control the memory,
wherein the memory comprises:
a pseudorandom number generator configured to generate a pseudorandom number using an initial value transferred from the memory controller;
an access key register configured to store an access key transferred from the memory controller;
a counter configured to count the number of times that the access key register is updated to generate an update number;
a logic operation circuit configured to generate an authentication key by performing a logic operation on the pseudorandom number and the update number;
a comparison circuit configured to compare the access key and the authentication key; and
a security area to which access is allowed when the comparison result of the comparison circuit indicates that the access key and the authentication key are the same,
wherein the pseudorandom number generator comprises a Linear Feedback Shift Register (LFSR),
wherein the initial value is used as a seed of the LFSR, and
wherein the LFSR has a feedback characteristic which is decided by a coefficient transferred from the memory controller.

9. The memory system of claim 8, wherein the memory controller comprises:
a controller pseudorandom number generator configured to generate a controller pseudorandom number using the initial value;
a controller counter configured to count the number of times that the memory controller updates the access key register of the memory; and
a controller logic operation circuit configured to generate the access key by performing a logic operation on the controller pseudorandom number and the count value of the controller counter.

10. The memory system of claim 9,
wherein the controller pseudorandom number generator is configured in the same manner as the pseudorandom number generator,
wherein the controller counter is configured in the same manner as the counter, and
wherein the controller logic operation circuit is configured in the same manner as the logic operation circuit.

11. The memory system of claim 8,
wherein the pseudorandom number generator comprises a Linear Feedback Shift Register (LFSR),
wherein the initial value is used as a seed of the LFSR, and
wherein the LFSR has a feedback characteristic which is decided by a coefficient transferred from the memory controller.

12. The memory system of claim 11, wherein the LFSR performs a shift operation in response to a shift command transferred from the memory controller.

13. The memory system of claim 12, wherein the memory further comprises:
an enable register configured to store an enable bit for indicating whether the security area is used; and
a coefficient register configured to store the coefficient.

14. The memory system of claim 12, wherein the memory controller transfers the initial value and the coefficient to the memory during an initialization operation of the memory.

15. The memory system of claim 8, wherein the logic operation circuit comprises a plurality of XOR gates configured to perform a logic operation on the pseudorandom number and the update number.

16. The memory system of claim 8,
wherein the security area is included in a memory core of the memory, and wherein the memory core comprises a normal area to which access is allowed, regardless of the comparison result of the comparison circuit.

17. The memory system of claim 16,
wherein the memory further comprises an error correcting circuit configured to correct an error of data outputted from the memory core, and
wherein the error correcting circuit is disabled when the security area is accessed.

18. The memory system of claim 16, wherein the memory further comprises:
a command decoder configured to generate an active signal by decoding a command transferred from the memory controller;
an area determination circuit configured to determine whether access to the security area is requested or access to the normal area is requested, using some bits of a row address transferred from the memory controller; and
a block circuit configured to block transfer of the active signal to the memory core, when the comparison result of the comparison circuit indicates that the access key and the authentication key are different from each other, in the case that the area determination circuit determines that the access to the security area is requested.

19. A security system comprising client and server devices,
wherein each of the client and server devices includes:
a first circuit configured to generate a pseudorandom number based on a seed value and a coefficient; and
a second circuit configured to count a number of updates of a first key to generate an update number,
wherein the client device further includes a third circuit configured to generate the first key based on the pseudorandom number and the update number generated thereby, and
wherein the server device further includes:
a fourth circuit configured to generate a second key based on the pseudorandom number and the update number generated thereby; and a fifth circuit configured to allow access to a secured area depending on the first and second keys, wherein the pseudorandom number generator comprises a Linear Feedback Shift Register (LFSR), wherein the initial value is used as a seed of the LFSR, and wherein the LFSR has a feedback characteristic which is decided by a coefficient transferred from the memory controller.

* * * * *